No. 887,831. PATENTED MAY 19, 1908.
E. J. MUTH.
DUST GUARD FOR ROLLERS.
APPLICATION FILED APR. 13, 1904.
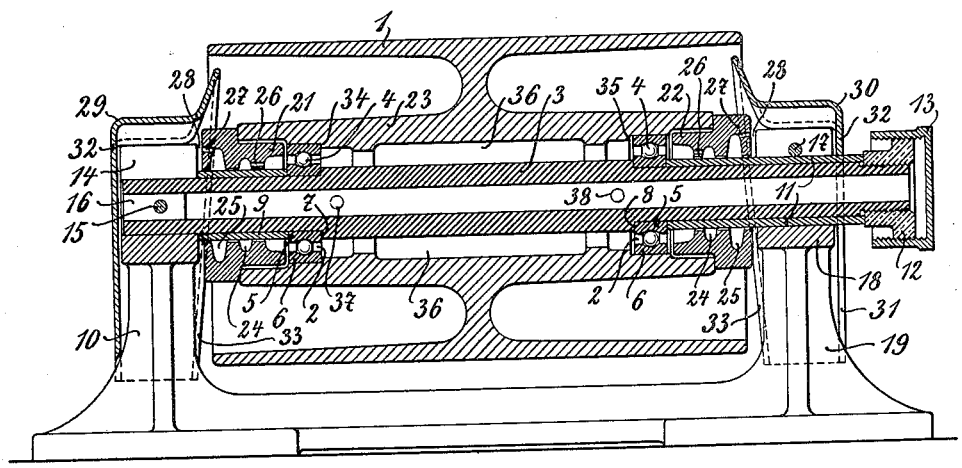
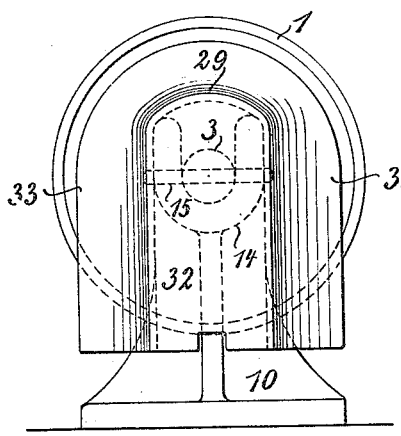 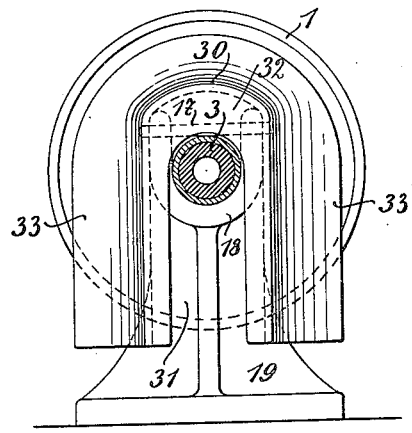
WITNESSES
Inventor
EMIL JAKOB MUTH
By Dickerson, Brown, Raegener & Binney
his attys

UNITED STATES PATENT OFFICE.

EMIL JAKOB MUTH, OF BERLIN, GERMANY, ASSIGNOR, BY MESNE ASSIGNMENTS, TO MUTH-SCHMIDT, MASCHINENFABRIK FÜR GURTFÖRDERER UND TRANSPORTANLAGEN G. M. B. H., OF BERLIN, GERMANY.

DUST-GUARD FOR ROLLERS.

No. 887,831.      Specification of Letters Patent.      Patented May 19, 1908.

Application filed April 13, 1904. Serial No. 202,958.

*To all whom it may concern:*

Be it known that I, EMIL JAKOB MUTH, a subject of the Emperor of Germany, and a resident of Berlin, Germany, have invented certain new and useful Improvements in Dust-Guards for Rollers, of which the following is a specification accompanied by drawings.

The present invention relates to rollers for conveyer bands, and has for its chief object the provision of means whereby the life of the conveyer band may be prolonged by reducing the slip of the band upon the rollers to a minimum, this being effected by reducing the friction of the rollers as much as possible.

Another object of the present invention is the simplification of the construction and arrangement of the various parts of the roller, whereby the rollers can be readily dismounted and taken to pieces when desired, and readily re-assembled.

In the case of conveyer bands, the angle subtended at the axis of the conveyer roller by the arc of contact between the band and the surface of the roller, is so small that it is of the greatest importance to reduce the frictional resistance of the roller to rotation to a minimum in order to prevent the slipping of the band upon the roller and thereby the wasting of the expensive bands. The employment of roller or ball bearings has hitherto been entirely out of the question, on account of the dust and dirt continually falling over the edge of the conveyer band and settling upon and penetrating into the bearings.

The present invention chiefly consists in providing conveyer rollers with roller or ball bearings and in the combination therewith of means whereby any dust or dirt, which begins to work its way towards the roller or ball bearings is arrested and subsequently ejected, these means thus serving to maintain the bearings free from dust and dirt.

The invention also consists in the combinations and arrangements of parts hereinafter described and claimed.

The embodiment of the present invention is illustrated in the accompanying drawings, in which Figure 1 is a longitudinal section of a conveyer roller. Fig. 2 is an end elevation of the left-hand end of the roller shown in Fig. 1. Fig. 3 is a part sectional end elevation of the right hand end of the said roller.

The conveyer-band roller 1 is revolubly supported by the ball bearings 2, 2 on the stationary hollow spindle 3. Each of the said ball-bearings consists of balls 4, 4 and of inner and outer ball-races 5, 6 respectively. The positions of the ball-bearings are determined by the shoulders 7, 8 on the spindle 3, against which the inner ball-races 5 abut, and by the sleeves 9, 11, the former of which abuts at one end against the left-hand ball-bearing and at the other end against the pedestal 10 supporting the left-hand end of the spindle. The sleeve 11 is provided on the spindle at the other end, and abuts at one end against the right-hand ball-bearing and at the other end against the grease-box 12 which is screwed upon the end of the spindle and presses the said sleeve against the ball-bearing.

13 is the cover of the grease-box, which is screwed upon the latter. The grease-box serves as means for forcing lubricating grease through the bearings. Shoulders 34, 35 are provided on the inner surface of the boss 23 of the roller The annular space 36 between the boss 23 and the spindle 3 communicates with the interior of the hollow spindle by means of the holes 37, 38 formed in the spindle wall. The spindle 3 is secured in the fork 14 of the pedestal 10 by means of the cotter or pin 15, Figs. 1 and 2, which passes transversely through the fork of the pedestal and spindle, and also through the plug 16 which serves to stop up the end of the spindle. The pin 17 holds down the right-hand end of the spindle 3 in the fork 18 of the pedestal 19, which is preferably part of the same casting as the pedestal 10 and the base 20. The pin 17 passes immediately over the sleeve 11 which rests in the fork 18.

21, 22 are two dust-traps or dust-ejectors, which are screwed on the ends of the boss 23 of the roller. These dust-traps loosely surround the sleeves 9, 11, a small interval existing between each sleeve and the internal adjacent cylindric surfaces of the corresponding trap. The sleeves, as far as the dust-traps are concerned, may be considered as part of the spindle. The traps possess ring-shaped recesses 24, 25, the inner recess 24 of each trap being connected by means of a small passage 26 with the space close to the adjacent ball-bearing, and the outer recess 25 of each trap being connected with the exterior by means of one or more passages 27 which run in an outward direction, that is, away from the axis of the spindle, for the purpose hereinafter described. In order to prevent as much as possible the falling of dust and dirt into the spaces 28 between the pedestals and the traps 21, 22, protecting caps 29, 30 are mounted upon said pedestals 10, 19 respectively. These two caps are similar to one another, with the exception that the cap 30 is provided with the recess 31, Fig. 3, which allows the cap to straddle the sleeve 11. Each cap has a front wall 32 which extends into the interior of the roller where it is bent upwards and outwards. The two side walls or wings 33 likewise project towards the interior of the roller where they are bent outwards, so that the fork is inclosed or enveloped as completely as possible by the cap. The above mentioned pins 15, 17 which pass through the walls of the caps, serve to secure the latter on the pedestals.

When the roller is in working condition, the grease-box, the hollow spindle, and the space 36 between the boss 23 and the spindle, is filled with lubricating grease or fat. On screwing in the grease-box cover 13, the grease is forced through the holes 37, 38 in the spindle and through the ball-bearings 2, 2, after passing through which it enters the open ends of the rotating dust-traps 21, 22, passes through the passages 26, into the inner recesses 24, and thence between the traps and the surfaces of the sleeves 9, 11, respectively, into the comparatively large outer recesses 25, 25 from which the grease or fat, together with the dust or dirt which it has taken up in passing over the sleeves is ejected through the passages 27, 27 by means of centrifugal force, said passages being, for the purpose of allowing this centrifugal action to take place, directed away from the axis as above described. These dust-traps thus form means producing a plurality of constrictions of the annular space 36 between the boss and the spindle, these constrictions being always occupied by the lubricating grease or fat on its passage from the bearings outwards. By these means it is thus rendered impossible for dust or dirt arising from the conveyer to enter as far as the ball-bearings, as any dust or dirt entering the ejecting traps 21, 22 is ejected through the passages 27, 27.

By removing the pins 15, 17, it will be observed, the spindle 3 with the roller mounted thereon can be lifted out of the forks, and the whole can at once be taken to pieces. The pin 15 and the pedestal 10 thus not only serve to fix the spindle 3, but also to maintain the correct assemblage of the various parts carried by the spindle, the removal of said pin and of the pin 17 allowing all the parts to be dismounted. The parts can also be re-assembled with the greatest ease.

It is of course to be understood, that my invention is not limited to the particular construction and arrangement of parts shown in the drawings, but that the scope of my invention is indicated by the claims. Thus, e. g., by the term "ball bearings" as used in the claims I intend of course to include rollers which are well known mechanical equivalents of the balls.

What I claim is—

1. The combination of a roller having an annular chamber extending inward from each end thereof, a hollow spindle for feeding lubricant to the roller, journal bearings for said roller, a dust trap connected with each end of the roller and surrounding the hollow spindle, for preventing the entrance of dust and dirt into said bearings, and a dust cap at each end of said roller, each of said dust caps extending at its upper end into the adjacent annular chamber of the roller.

2. The combination of a roller having an annular chamber extending inward from each end thereof, journal bearings for said roller, and a dust cap at each end of said roller, each of said dust caps extending at its upper end into the adjacent annular chamber of the roller, whereby to protect the journal bearings.

3. The combination of a roller having an annular chamber extending inward from each end thereof, a stationary hollow spindle having perforations for feeding lubricating material to the roller, a closing cap on one end of said spindle, a dust cap fitting across the opposite end of said spindle and extending at its upper end into the adjacent annular chamber of the roller, and a second cap slotted to straddle the spindle adjacent to the closing cap and fitting at its upper end into the adjacent annular chamber of the roller.

4. The combination with a roller having a stationary hollow spindle for feeding lubricant to the roller, of a dust trap connected with each end of the roller and surrounding the hollow spindle, each dust trap having a plurality of annular recesses opening onto the spindle and connected with each other by small passages, the outer annular recess having one or more outlet passages directed away from the axis of the spindle so as to cause the exit of lubricating material by centrifugal force.

5. The combination of a roller having a hollow boss, a hollow stationary spindle, provided with holes passing through the same sleeves on said spindle, pedestals each provided with a fork for supporting said spindle, ball bearings arranged between the boss and the spindle and revolubly supporting the roller on the spindle, thereby forming an annular space between the boss and the spindle, dust traps having a plurality of circular grooves and passages connecting said grooves with said annular space between each bearing and the corresponding end of the spindle; means for forcing lubricating grease through the bearings whereby the grease is forced to pass from the bearings and to be finally ejected, carrying with it any dust or dirt which may have found entrance.

6. The combination of a roller having a hollow boss, a hollow stationary spindle provided with holes passing through the same, sleeves on said spindle, pedestals each provided with a fork for supporting said spindle, ball bearings arranged between the boss and the spindle and revolubly supporting the roller on the spindle, thereby forming an annular space between the boss and the spindle, dust traps having a plurality of circular grooves and passages connecting said grooves with said annular space between each bearing and the corresponding end of the spindle, a hollow nut at the hollow end of said spindle for forcing lubricating grease through the bearings whereby the grease is forced to pass through the holes in the hollow spindle into the hollow boss and then through the bearings to be finally ejected through said circular grooves.

In testimony whereof I have signed this specification in the presence of two subscribing witnesses.

EMIL JAKOB MUTH.

Witnesses:
  WOLDEMAR HAUPT,
  HENRY HASPER.